(12) United States Patent
Koizumi et al.

(10) Patent No.: US 6,917,920 B1
(45) Date of Patent: Jul. 12, 2005

(54) SPEECH TRANSLATION DEVICE AND COMPUTER READABLE MEDIUM

(75) Inventors: Atsuko Koizumi, Sagamihara (JP); Hiroyuki Kaji, Tama (JP); Yasunari Obuchi, Kokubunji (JP); Yoshinori Kitahara, Tachikawa (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/478,336

(22) Filed: Jan. 6, 2000

(30) Foreign Application Priority Data

Jan. 7, 1999 (JP) .......................................... 11-001669

(51) Int. Cl.[7] .......................... G10L 15/18; G10L 15/26
(52) U.S. Cl. .......................... 704/277; 704/270; 704/2; 704/257; 704/235
(58) Field of Search .............................. 704/2, 9, 270, 704/277, 257, 235

(56) References Cited

U.S. PATENT DOCUMENTS

| 5,477,451 A | * 12/1995 | Brown et al. ................... 704/2 |
| 5,995,935 A | * 11/1999 | Hagiwara et al. ........... 704/270 |
| 6,154,720 A | * 11/2000 | Onishi et al. ................... 704/2 |

FOREIGN PATENT DOCUMENTS

| JP | 56-88564 | 7/1981 |
| JP | 4-182870 | 6/1992 |
| JP | 6-325072 | 11/1994 |
| JP | 8-328585 | 12/1996 |

OTHER PUBLICATIONS

Lee, Kai–Fu, "Automatic Speech Recognition: The Development of the SPHINX System", 1989, Sect. 2.4, pp. 32–44.

* cited by examiner

*Primary Examiner*—David D. Knepper
(74) *Attorney, Agent, or Firm*—Mattingly, Stanger, Malur & Brundidge, P.C.

(57) ABSTRACT

A translation device which has both advantages of a table look-up translation device and advantages of a machine translation device by leading the user's utterance through a sentence template suitable for the user's intent of speech is realized. Since the translation device searches for sentence templates suitable for the user's intent of speech with an orally inputted keyword and displays retrieved sentences, the user's utterance can be lead. In addition, the user is free from a troublesome manipulation for replacing a word since an expression uttered by the user is inserted into a replaceable portion (slot) within the sentence template, and the translation device translates a resulting sentence with the replaced expression embedded in the slot.

9 Claims, 14 Drawing Sheets

FIG. 6

| 601 | 602 | 603 | 604 | 605 | 606 | 607 | 608 6091 | 6092 | 6093 | 6094 | 6095 | 6096 |
|---|---|---|---|---|---|---|---|---|---|---|---|---|
| 1001 | 0 | | | | | | | | | | | |
| 1002 | 0 | 2056,..., 3123, 3124,... | | 予約してあります。 | ヨヤクシテアリマス | I have a reservation. | ai hXav Xe rezXevelSXen | 0 | | | | |
| 1003 | 0 | 2345,..., 3123, 3124,... | 予約 | 予約したい。 | ヨヤクシタイ | I'd like to make a reservation. | aid laik tXe meik Xe rezXevelSXen | 0 | | | | |
| .. | | | 予約；変更 | 予約を変更したい。 | ヨヤクヲヘンコウシタイ | I'd like to change my reservation. | aid laik tXe tSeindY mai rezXevelSXen | 0 | | | | |
| 1356 | 0 | | どこ；場所 | 一番近い⟨s1⟩はどこですか？ | イチバンチカイ⟨s1⟩ワドコデスカ | Where is the nearest ⟨s1⟩? | HweXeR iz THXe niXeRest ⟨s1⟩ | 1 | バス停 | bus stop | bXes s t Ap | ⟨PLACE⟩ NO ARTICLE : SINGULAR |
| .. | | | 予約；飛行機；フライト | 一番早く乗れる便を探してください。 | イチバンハヤクノレルビンヲサガシテクダサイ | Get me the earliest available flight. | get mi: THXe Xe:lIest XevellXebl flait | 0 | | | | |
| 3123 | 1002, 1003 | | 予約；飛行機；フライト；チケット；切符 | ⟨s1⟩から⟨s2⟩までの⟨s3⟩の⟨s4⟩が欲しい。 | ⟨s1⟩カラ⟨s2⟩マデノ⟨s3⟩ノ⟨s4⟩ガホシイ | I'd like ⟨s4⟩ from ⟨s1⟩ to ⟨s2⟩ on ⟨s3⟩. | aid laik ⟨s4⟩ frXem ⟨s1⟩ tXe ⟨s2⟩ Xen ⟨s3⟩. | 4 | ダラス マイアミ 14日 往復切符 | Dallas Miami 14th round-trip ticket | d XalXes maiXami tXe:Rti:nTh raund trip tiket | ⟨CITY⟩ NO ARTICLE ⟨CITY⟩ NO ARTICLE ⟨DATE⟩ NO ARTICLE |
| 3124 | | | | | | | | | 往復切符 片道；切符；切符 | round trip tiket | | INDEFINITE ARTICLE : SINGULAR |

FIG. 7

| 701 | 702 | 703 | 704 | 705 | 706 | 707 | 708 | 709 | 710 |
|---|---|---|---|---|---|---|---|---|---|
| 0500 1 | 銀行 | キンコウ | キンコ゜ | COMMON NOUN | \<PLACE\> \<ORGANIZATION\> | bank | bXank | COMMON NOUN; COUNTABLE; -s; STARTING WITH CONSONANT | |
| .. | .. | .. | .. | .. | .. | .. | .. | .. | .. |
| 1003 1 | ダラス | ダラス | ダラ゜ | PROPER NOUN | \<CITY\> | Dallas | dXalXes | PROPER NOUN; UNCOUNTABLE; STARTING WITH CONSONANT | |
| .. | .. | .. | .. | .. | .. | . | | .. | .. |
| 3833 3 | 予約 | ヨヤク | ヨヤ゜ | SURU-VERB STEM | \<ACTION\> | reservation | rezXeveiSXen | COMMON NOUN; COUNTABLE; -s; STARTING WITH CONSONANT | 1001, 1002, 3123, 3214,... |
| A001 1 | \<場所\> | | | CATEGORY CODE | \<PLACE\> | | | | 1356, 1357,... |
| A001 2 | \<建物\> | | | CATEGORY CODE | \<PLACE\> | | | | 1414,... |

[予約] reservation
☆ 予約してあります。
☆ 予約したい。
☆ 予約を変更したい。

○ GO
○ BACK (基本例文) 予約してあります。
(基本例文) 予約したい。
(基本例文) 予約を変更したい。
(基本例文) 予約をキャンセルしたい。
(基本例文) 予約を確認したい。
…
予約なしで参加できますか。
ここで予約できますか。
割安のチケットはありませんか。
…
一番早く乗れる便を探してください。
ダラスからマイアミまでの１４日の往復切符が欲しい。
座席が取れ次第、ここに連絡してください。
…
７時に４人で予約しています。
予約を８時に変更できませんか。
…

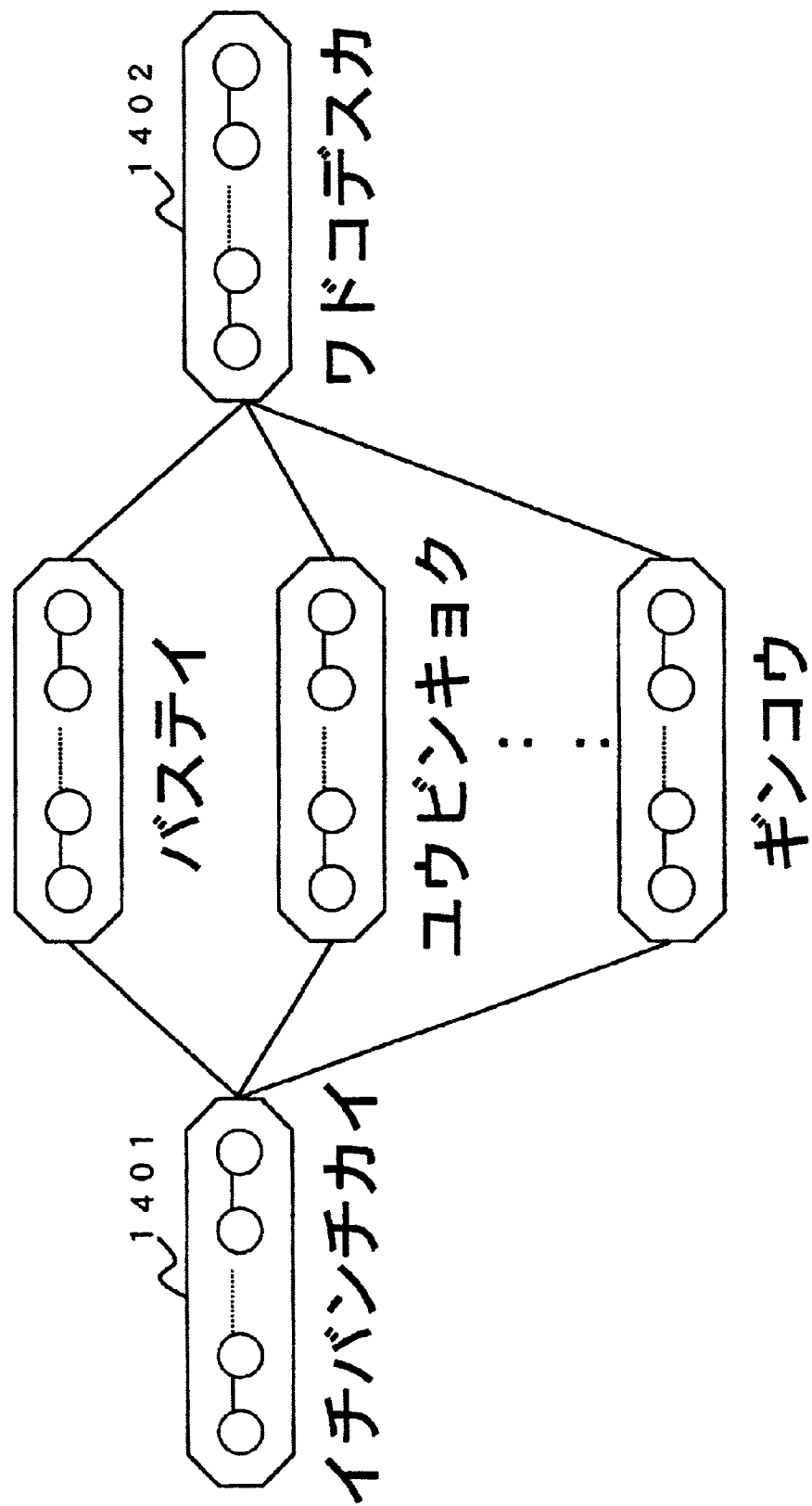

SPEECH TRANSLATION DEVICE AND COMPUTER READABLE MEDIUM

BACKGROUND OF THE INVENTION

The present invention relates to a speech translation device and a computer readable medium, and more particularly to a speech translation device that leads the user's utterance, suitable for use in a portable translator for overseas travel or the like, and a recording medium for implementing the same.

Conventional translation devices are generally classified into two types. A first type of translation device is a device which translates an arbitrarily inputted sentence (hereinafter referred to as the "machine translation device"), and a second type of translator device is a device which searches previously prepared bilingual examples stored therein in accordance with a specific situation or a keyword to translate retrieved examples (hereinafter referred to as the "table look-up translation device").

As the first machine translation device, a number of text-based machine translation systems have already been used in practice. A translation method widely employed by these translation systems is a rule-based translation which translates based on a dictionary and grammatical rules. However, investigations have also been made on an example-based translation which utilizes examples since the rule-based translation encounters difficulties in describing a rule when it is fed with new sentence expressions (linguistic phenomena) which cannot be handled satisfactorily with grammatical rules.

On the other hand, a speech-based translation device has a problem in that a correct translation result is not provided unless speech recognition is correctly performed anyway. To solve this problem, JP-A-8-328585, for example, shows a method which calculates linguistic similarities between an inputted speech and all examples contained in an example database to select the most likely solution from a plurality of candidates resulting from the speech recognition.

As the second table look-up translation device, JP-A-56-88564, for example, describes a portable translation device which responds to a category specified by the user to display relevant examples, and then accepts a sentence selected by the user from the displayed examples to audibly output a translation of the selected sentence.

SUMMARY OF THE INVENTION

In a scene of overseas travel, conversations with other people are often short and relatively routinary such as requests, questions and so on. However, since travel is an unusual situation, specific contents to be spoken, and suitable expressions or vocabularies may not immediately occur to travelers even in their mother languages, when they intend to speak. For this reason, the first machine translation device may not sufficiently accomplish its object of supporting conversations in foreign languages during travels because of the user's inability of immediately remembering a sentence to input. For example, when a traveler asks where to receive his baggage checked in the plane, and presents his baggage-claim tickets to a personnel after he has got off an airplane, he cannot always remember appropriate Japanese sentences such as "Where can I receive my baggage from Flight No. 121 of American Air Line?", "My baggage has not yet come out. Here are my baggage-claim tickets" in complete forms. If he directly speaks with a party who understands Japanese, i.e., his mother language, they may come to mutual understanding between them, while feeing out the other party's reactions, through such conversation as "The baggage I left at the counter when I checked in at the airport are . . . , let me see, where . . . , the flight number? No. 121 of American Air.", "I'm afraid my baggage has not yet come out. Baggage-claim ticket? That's, . . . The copy I received when I left the baggage? Here you are." and so on. However, for translation into a foreign language with a machine translator, complete sentences such as "Where can I receive baggage from Flight No. 121 of American Air Line?" or "My baggage has not come out yet. Here are baggage-claim tickets" must be inputted for the machine translator to output satisfactory translations. In addition, unlike conversation in the mother language, even if the other party asks back to him such as "What is your flight number?", "Please show me your baggage-claim ticket.", or the like, he may not be able to understand, so that he must communicate sentences including sufficient information to the other party when he first speaks to the other party.

On the other hand, the second table look-up translation device which searches previously prepared bilingual examples can avoid the problem of the first translation device involved in the arbitrary sentence input. In addition, the simple processing of the second translation device makes it more feasible to implement it as a portable translator. However, a conventional method of searching examples classified in accordance with scenes in response to a selection on a menu has its inherent problem, when a large number of examples are retrieved from a search, in that a long time is taken to find a suitable example the user wants to use, because the user must narrow down scenes over again by repetitively pressing selection buttons, or scroll many examples retrieved for a single scene on a rather small display. Also, a conventional method of finding substitution candidates for a word in an example through such a means as scrolling or the like has a problem of poor operability when many substitution candidates are provided for a word. For example, when a traveler asks where to receive baggages in the aforementioned scene, it is tedious for him that once he finds a sentence "Where can I receive baggage from Flight No. 753 of Japan Air Line?", he should replace the flight number in the sentence with "Flight No. 121 of American Air Line" by scrolling the display and pressing buttons required for the replacement.

It is an object of the present invention to realize a translation device which provides both advantages of a table look-up translation device and advantages of a machine translation device by displaying a sentence template suitable for a user's intent of speech to lead the user's utterance.

To achieve the above object, the present invention provides a translation device which comprises a sentence file for storing a plurality of sentence templates, a speech recognition unit for recognizing an inputted speech, means for replacing an expression within a sentence template similar to the speech based on the speech, and for translating a resulting sentence, and a voice output unit for audibly outputting a translated sentence or a display for displaying the translated sentence. In addition, the present invention provides a computer readable recording medium having recorded thereon a program for causing a computer to operate as a translation device, wherein the program comprises the steps of recognizing a first speech by speech recognition means, retrieving sentence templates related to the first speech and displaying the retrieved sentence templates on a display, recognizing a second speech by the speech recognition device, replacing an expression within one of the retrieved sentence templates based on the second speech and translating a resulting sentence, and displaying the translation result on the display or audibly outputting the translation result.

In the translation device, for example, which retrieves previously prepared sentences, the sentences stored in the sentence file are described as sentence templates including a portion in which an expression can be replaced (hereinafter referred to as a "slot"). Each sentence template includes, as information related to a slot specified therein, a category code (for example, information such as place, date, or the like) and a representative example for any expression which may appear in the slot. Each sentence template is given keywords or a keyword (for example, information such as reservation, flight, ticket, or the like). Keywords may be not only specific words but also category codes.

A dictionary contained in the translation device of the present invention describes pronunciation information and a category code for each word, as information used to retrieve sentence templates with an orally inputted keyword. In addition, the dictionary describes grammatical information and a translated word for each entry, and grammatical information for the translated word, as information used to perform template translation.

As means for retrieving sentence templates, the translation device includes means for word recognition for recognizing an orally inputted keyword, means for retrieving sentence templates which includes keyword information that describes a recognized word and its category code, and means for displaying a plurality of sentence templates on a screen.

As means for performing the template translation, the translation device includes means for recognizing spoken sentences which selects sentence templates with high similarities to an orally inputted sentence from a plurality of sentence templates, means for recognizing spoken words which references phonetic information in the dictionary to recognize an expression inserted in a slot, means for referencing the dictionary and translation rules to determine a translated word and its form for the expression inserted in the slot, and means for generating a translated sentence by combining information on a translated sentence of the sentence template and a translation of an expression inserted in the slot.

When the user orally inputs a word, the translation device recognizes the inputted word and its category code by referencing the phonetic information in the dictionary. Then, the translation device retrieves sentence templates which have the word and the category code described in their keyword information, and displays retrieved sentence templates on the screen. As information on a slot included in a sentence, a representative example of an expression which may appear in the slot is described in a sentence template. Thus, for displaying sentence templates on the screen, the translation device displays each sentence template together with a representative example inserted in the slot.

While one or more sentence templates are being displayed on the screen, the user orally inputs a sentence which is composed of a sentence template and a desired expression inserted in a slot of the sentence template. Responsively, the translation device executes translation of the orally inputted sentence based on a sentence template with a high similarity of the sentence templates displayed on the screen, and displays a translated sentence. For example, when the user orally inputs a word "telephone", the translation device retrieves sentence templates which have the word "telephone" described in the keyword information. Displayed on the screen are such sentence templates as "Where is [a telephone]?", "Please tell me how to place a [local call].", "I'd like to place a [collect call] to [Japan].", and so on. The bracketed portions represents slots. The user, scrolling the screen, looks for a usable sentence. When the user finds a usable sentence, for example, "I'd like to place a [collect call] to [Japan].", he may orally input a sentence "I'd like to place an international call to Canada.". Responsively, the translation device recognizes that the user has used the sentence template "I'd like to place a [collect call] to [Japan].", also recognizes that "Japan" and "collect call" have been replaced with "Canada" and "international call", and executes the template translation.

These and other objects, features and advantages of the present invention will become more apparent in view of the following detailed description of the preferred embodiments in conjunction with accompanying drawings.

BRIEF DESCRIPTION OF THE DRAWINGS

FIG. 6 is a table showing the contents of a sentence file;

FIG. 7 is a table showing the contents of a dictionary;

FIG. 14 is a diagram illustrating an example of a finite state automaton for a sentence template.

DETAILED DESCRIPTION OF THE EMBODIMENTS

An embodiment of the present invention will hereinafter be described with reference to FIGS. 1 to 14. This embodiment provides a portable speech translation device which is intended for use by a user who speaks Japanese as the mother language when he travels in English-spoken countries.

Generally, the speech translation device of this embodiment is configured to retrieve and display sentence templates in response to a keyword orally inputted by the user. When the user utters a different word in place of a replaceable word within a sentence template, the speech translation device recognizes which sentence template was used and which word was replaced with which word, and displays and pronounces a translated sentence for the inputted sentence.

Figure 1:
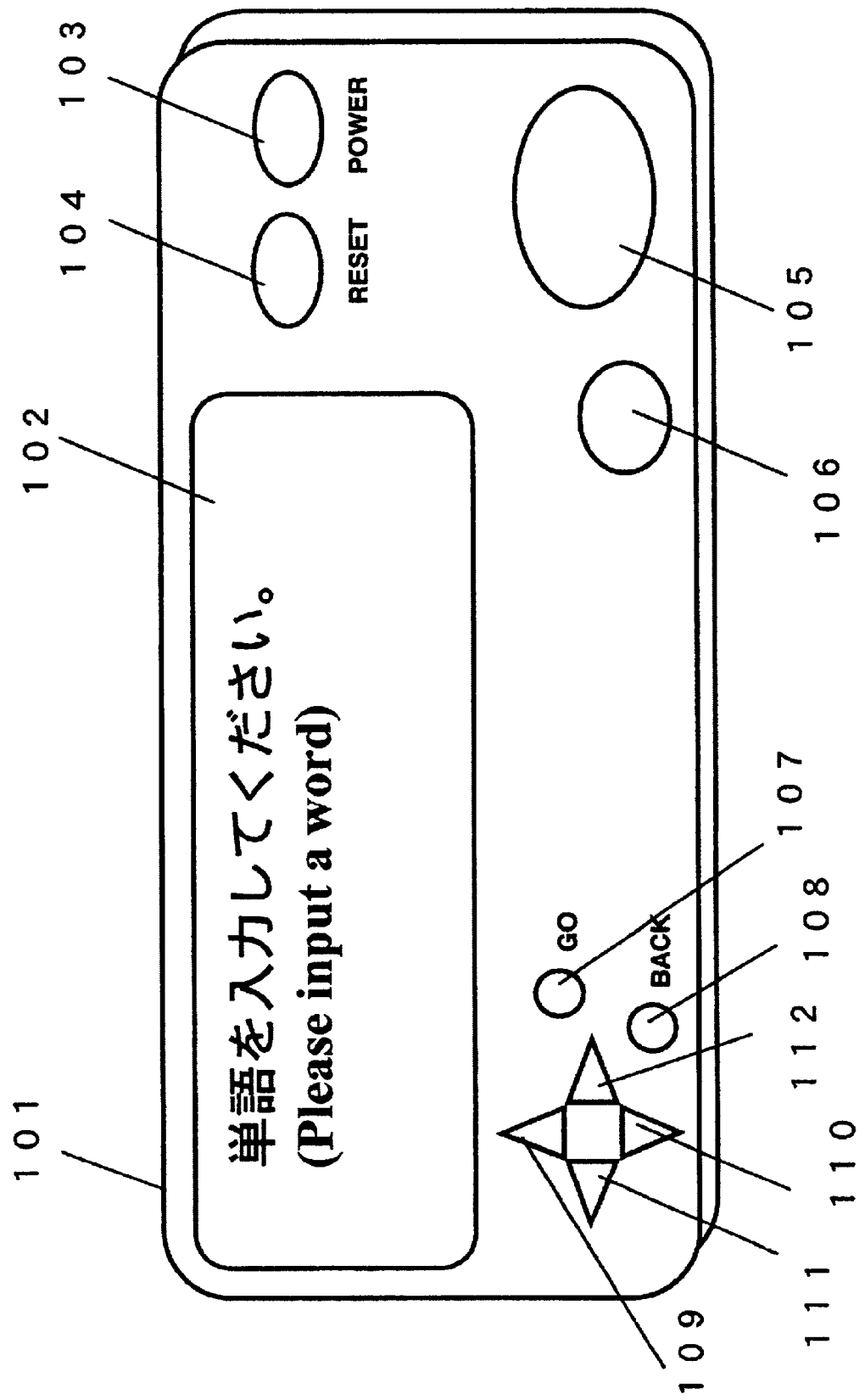
FIG. 1 is a diagram illustrating an outer appearance and an initial screen of an embodiment of a speech translation device according to the present invention.

Next, an outer appearance of the translation device of this embodiment will be described with reference to FIG. 1. FIG. 1 illustrates an outer appearance and an initial screen of the speech translation device according to this embodiment of the present invention. The speech translation device 101 comprises a display screen 102; a power switch 103; a reset button 104; a speaker 105 for audibly outputting a translated sentence; a microphone 106 for orally inputting a keyword for searching sentences; an execution button 107 for the user to instruct the translation device to search sentences, translate, pronounce a translated sentence, and so on; a "BACK" button 108 for turning back to a previous screen; and scroll buttons 109–112 for moving a cursor up, down, left and right on the screen.

Figure 2:
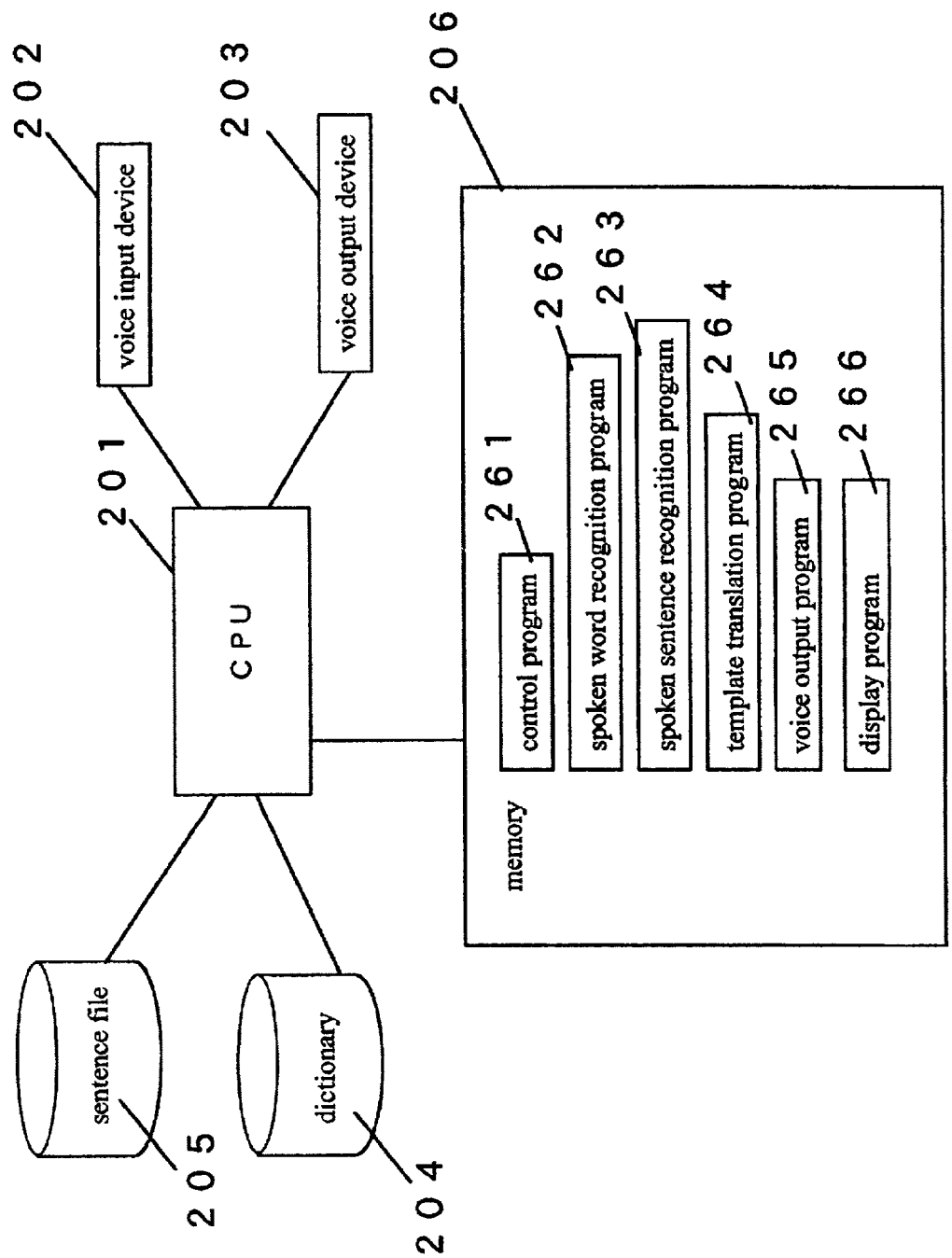
FIG. 2 is a block diagram illustrating the configuration of the embodiment of the speech translation device according to the present invention.

Next, the hardware configuration of the translation device according to this embodiment will be described with reference to FIG. 2. FIG. 2 illustrates the hardware configuration of the speech translation device. The speech translation device is composed of a CPU 201 responsible for controlling the entire device, as well as executing speech recognition, translation, and speech synthesis; a voice input device 202; a voice output device 203; a dictionary 204; a sentence file 205; and a memory 206. The memory 206 stores a control program 261; a spoken word recognition program 262; a spoken sentence recognition program 263; a template translation program 264; a voice output program 265; and a display program 266.

Next, the contents of the sentence file will be described with reference to FIG. 6.

FIG. 6 shows the contents of the sentence file 205. For each sentence template, the sentence file 205 describes a sentence number 601; a list of basic sentence numbers 602; a list of detailed sentence numbers 603; keywords 604; a sentence template 605 in the source language; pronunciation information 606 which describes the pronunciation of an associated sentence template in the source language; a sentence template 607 in the target language; pronunciation information 608 for the translated sentence which describes the pronunciation of an associated sentence template in the target language; and slot information 609. The slot information 609 describes a number 6091 of slots, and also describes for each slot a representative example 6092 of an expression which may be inputted in the slot; a translation of the representative example 6093; pronunciation information 6094 for a translation of the representative example; semantic information 6095 which describes which kind of expression is inputted in the slot; and grammatical information 6096 which describes grammatical characteristics (article, single/plural, and so on) of a portion associated with the slot in a translated sentence.

Sentences in the sentence file 205 include basic sentences such as 「予約したい」 (I'd like to make a reservation), and detailed sentences such as 「一番早く乗れる便を探してください」 (Please find out the earliest available flight.). For a basic sentence, sentence numbers of detailed sentences corresponding thereto are described in the list of detailed sentence numbers 603. For a detailed sentence, sentence numbers of basic sentences corresponding thereto are described in the list of basic sentence numbers 602.

When a keyword is used to retrieve sentences, basic sentences are displayed in an upper portion of the screen. As the user selects 「予約したい」 (I'd like to make a reservation) to instruct the translation device to display detailed sentences, detailed sentences such as 「一番早く乗れる便を探してください」 (Please find out the earliest available flight.) are displayed. In the sentence template 605 in the source language and the sentence template 607 in the target language, any replaceable expression is represented by a slot.

For displaying on the screen, a word in the representative example 6092 is embedded in a slot of a sentence template in the source language, and the sentence template in the source language is displayed with this word embedded in the slot. When the user instructs the translation device to display or pronounce a translated sentence without replacing any word, the translation device displays the translated sentence embedded with the translation 6093 of the representative example, and pronounces the pronunciation information 608 for the translated sentence embedded with the pronunciation information 6094 of the representative example.

The semantic information 6095 for a slot may be described in the form of list such as "round-trip ticket; one-way ticket; ticket" or by using a category code such as "<place>". When a slot can be replaced with any word, no condition is described.

Sentences having a category code such as "<place>" described in the keyword 604 are retrieved from all words having the category code. For example, when the user inputs, as a keyword, a word having a category code "<place>" such as 「郵便局」 ("post office"), 「バス停」 ("bus stop") or 「銀行」 ("bank"), or a sentence 1356 「一番近い<S1>はどこ」 ("Where is the <S1> nearest from here?") is retrieved and displayed.

Next, the contents of the dictionary 204 will be described with reference to FIG. 7. FIG. 7 shows how the dictionary 204 is organized. For each word item, the dictionary describes a word number 701; an entry 702; reading 703; pronunciation information 704; grammatical information 705; a category code 706; a translated word 707; pronunciation information 708 for the translated word; grammatical information 709 for the translated word; a sentence number list 710. When a record has a category code such as "<place>" as an entry, the sentence number list 710 indicates sentences which have the category code as a keyword.

Figure 3:
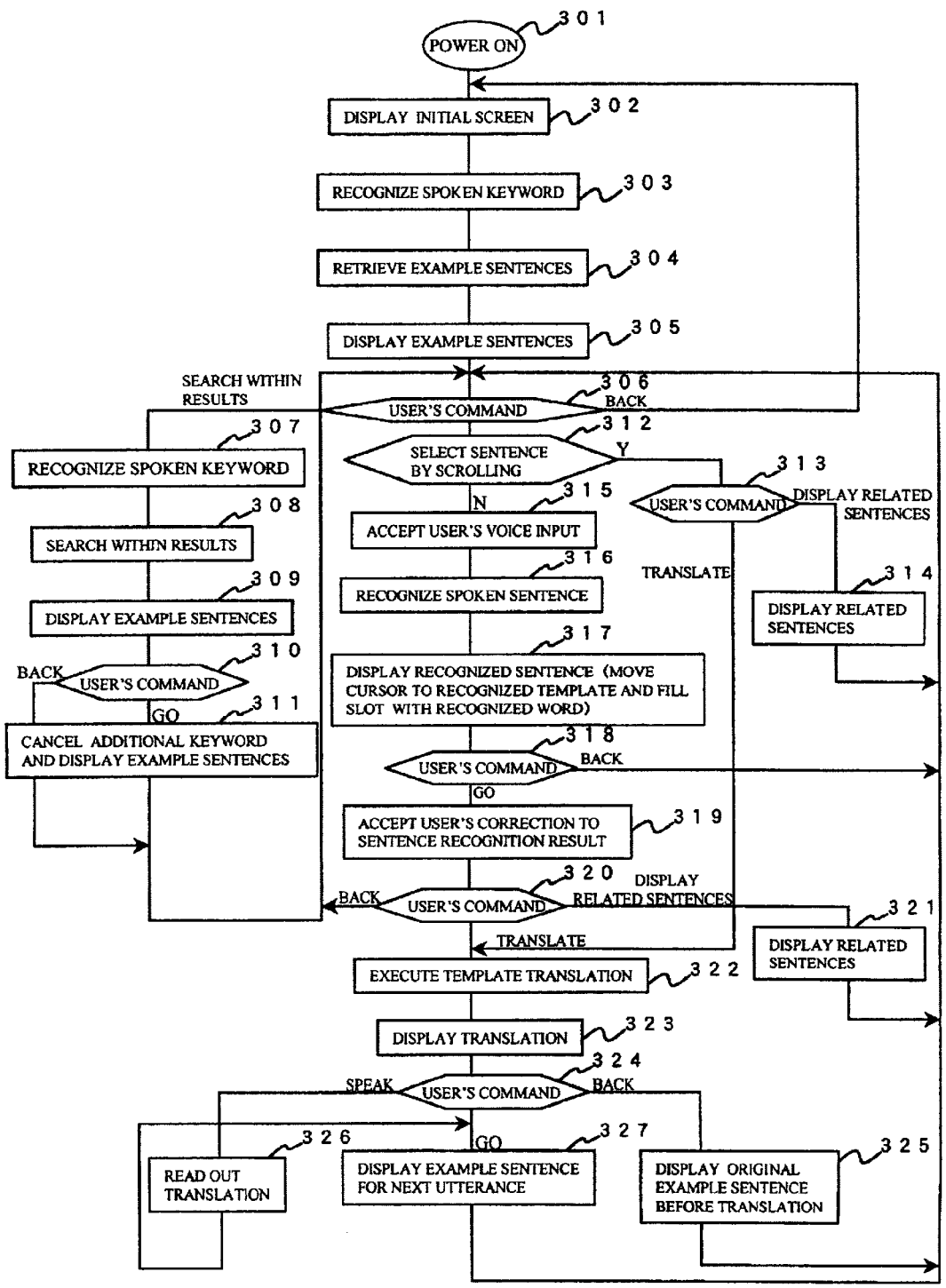
FIG. 3 is a flow chart illustrating the operation of the embodiment of the speech translation device according to the present invention.

Next, the operation of the speech translation device according to this embodiment will be described with reference to FIG. 3. FIG. 3 is a flow chart illustrating an outline of the operation performed by the speech translation device. As the user presses the power button 103 (301), the programs stored in the memory 206 is initiated to display the initial screen on the display screen 101 (302). When the user orally inputs a word through the microphone 106 while the initial screen is being displayed on the display screen 101, the speech translation device performs spoken keyword recognition (303).

Next, the keyword speech recognition will be described with reference to FIG. 4. First, as the user orally inputs a word (402), the speech translation device references the dictionary 204 to recognize the spoken word by a speech recognition algorithm such as a Hidden Marcov model (HMM) or the like (403), and displays word candidates on the screen (404).

Figure 8:
FIG. 8 illustrates an example of a display on a screen in a word candidate display step.

An example of a word candidate display screen will now be described with reference to FIG. 8. On the word candidate display screen as illustrated, a Kana notation of a first candidate is displayed on the first line, and words for the first to tenth candidates are displayed on the second and subsequent lines. The word of the first candidate is initially reverse displayed. Subsequently, as the user manipulates the up, down, left or right scroll key, the reverse display moves to an upper, lower, left or right word, respectively. In this way, the user can select an intended word. The user can view a fourth and lower candidates not displayed on the screen in FIG. 8 by scrolling the screen with the down scroll key. When a word candidate has homonyms, the homonyms are displayed in a row. When a word candidate does not have homonyms, corresponding translated or English words are displayed on the same line. An "*" mark at the head of each word candidate indicates a keyword which is used to retrieve sentences.

Turning back to FIG. 4, as the user selects an intended word and presses the execution button (405), the word is established as a keyword for retrieving sentences (408), followed by termination of the keyword recognition processing (409). When the user fails to find an intended word in the displayed word candidates, the user may select the first line which shows the reading of the most probable word in Kana notation, and presses the execution button to modify an inputted word at a syllabable level (406), and again look up the dictionary (407). Alternatively, by pressing the "BACK" button (405), the user may return to the state before the speech translation device accepts a spoken keyword (before 402).

It should be noted that the word candidate display screen is provided for the user to confirm the result of the spoken keyword recognition, this may be used also as a bilingual dictionary since translated words are displayed together with word candidates. In addition, the speech translation device may be adapted to generate the pronunciation when the user selects a word and presses the execution button. While translated words are not displayed for homonyms on the word candidate display screen, the speech translation device may be adapted to proceed to the next screen on which translated words and relevant sentences are displayed as the user selects one from homonyms and presses the execution button.

Referring again to FIGS. 3 and 7, a sentence retrieval will next be described. When an input word is established, the speech translation device retrieves from the sentence file 205 those example sentences that have the numbers described in the sentence number 710 of the input word in the dictionary 204 (304), and displays the retrieved example sentences on the screen (305). For a word which has a description in the category code 706 in the dictionary, the speech translation device also retrieves those sentences that have the category code as a keyword. For example, for an input word 「銀行」 (bank), the speech translation device retrieves not only sentences which have 「銀行」 (bank) as a keyword but also sentences which have a category codes <place> or <organization> as a keyword. Numbers designated to sentences which have the category code <place> as a keyword are described in the sentence number 710 of the dictionary record which has "<place>" set in the entry 702.

Figure 9:
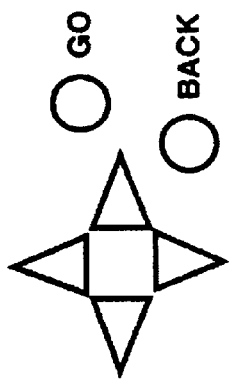
FIG. 9 illustrates an example of a display on the screen in an example display step.
Figure 10:
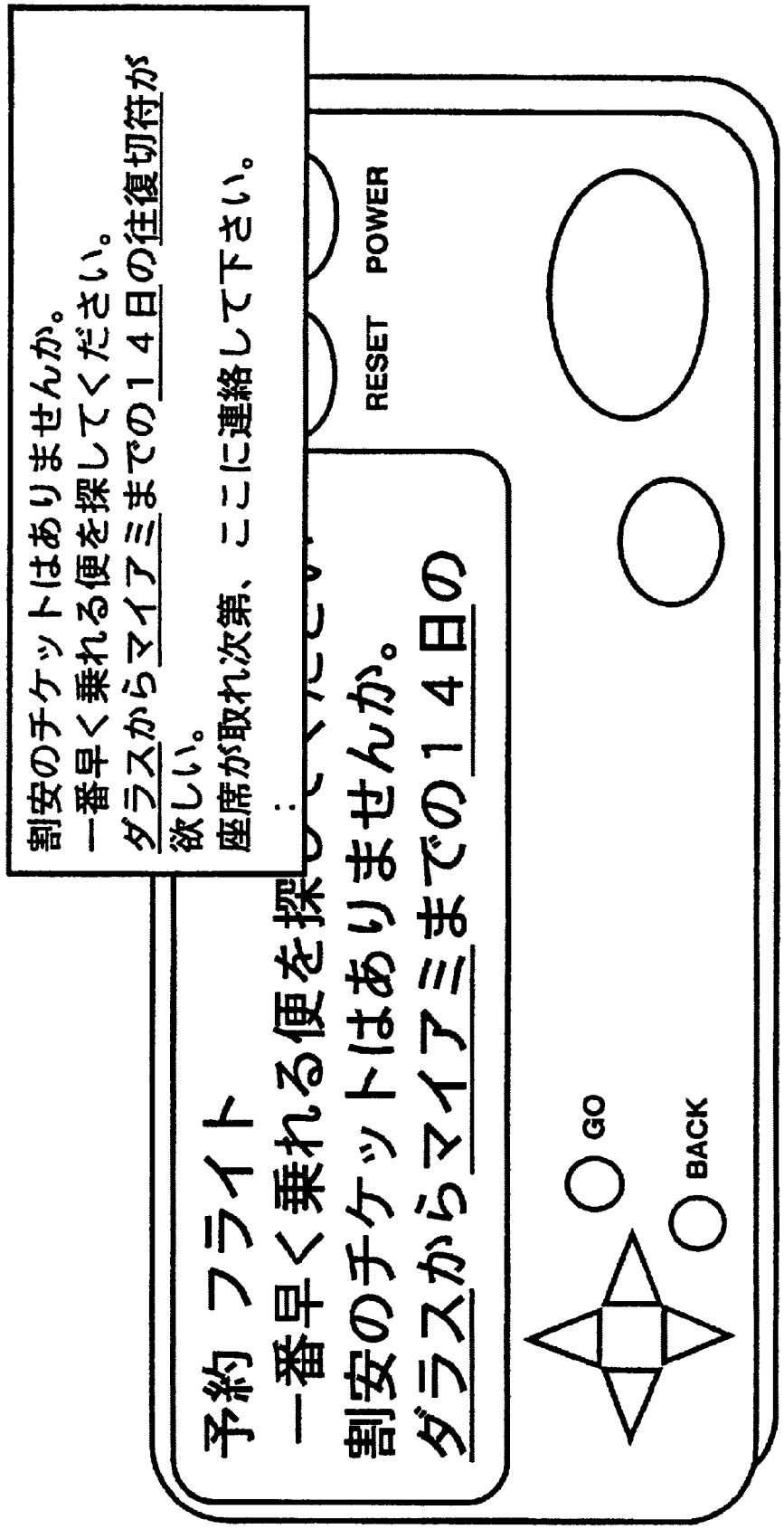
FIG. 10 illustrates an example of a display on the screen in a narrowed example display step.

FIG. 9 shows an example of a sentence display screen which is generated when sentences are retrieved with 「予約」 (reservation) used as a keyword. FIG. 9 shows retrieved sentences as 901. The sentence display screen displays the entry of the dictionary and a translated word for the keyword on the first line, and the first three of retrieved sentences on the second to fourth lines. Sentences on the fourth and subsequent sentences can be viewed by scrolling the screen with the down scroll key. A sentence having a mark "★" at the head indicates that this is a basic sentence. The sentence display screen displays several sentence templates in the source language which are embedded with the representative example(s) 607 in a slot(s), where underlined words indicate that they are replaceable. In FIG. 10, 「ダラス」 (Dallas), 「マイアミ」 (Miami), and 「１４日」 (14 days) are replaceable words.

Next, narrowing of sentences will be described referring again to FIG. 3. While a portion of retrieved sentences overflowing from the screen may be viewed by manipulating the up, down, left, right scroll keys, an additional keyword may be inputted to narrow down the retrieved sentences if there are too many. This makes it easier for the user to find a desired sentence. When user wants to narrow down sentences, the user first selects a keyword (reverse displays the keyword) displayed on the first line of the screen with scroll keys, and presses the execution button. Next, as the user orally inputs an additional keyword, the speech translation device executes the aforementioned spoken keyword recognition (307), narrows down the formerly retrieved sentences (308), and displays a reduced number of example sentences (309). FIG. 9 shows the result of retrieving sentences with 「予約」 (reservation) used as a keyword, and FIG. 10 shows the result of narrowing down the retrieved sentences in FIG. 9 with 「フライト」 (flight). When the user presses the "BACK" button after viewing the result of the narrowing, the speech translation device displays the example sentences back before the narrowing (311).

When the user selects a sentence without replaceable word, the user may select a sentence by moving the cursor with the scroll keys (312–314). As the user selects a sentence and presses the execution key, the speech translation device executes translation (322).

Figure 12:
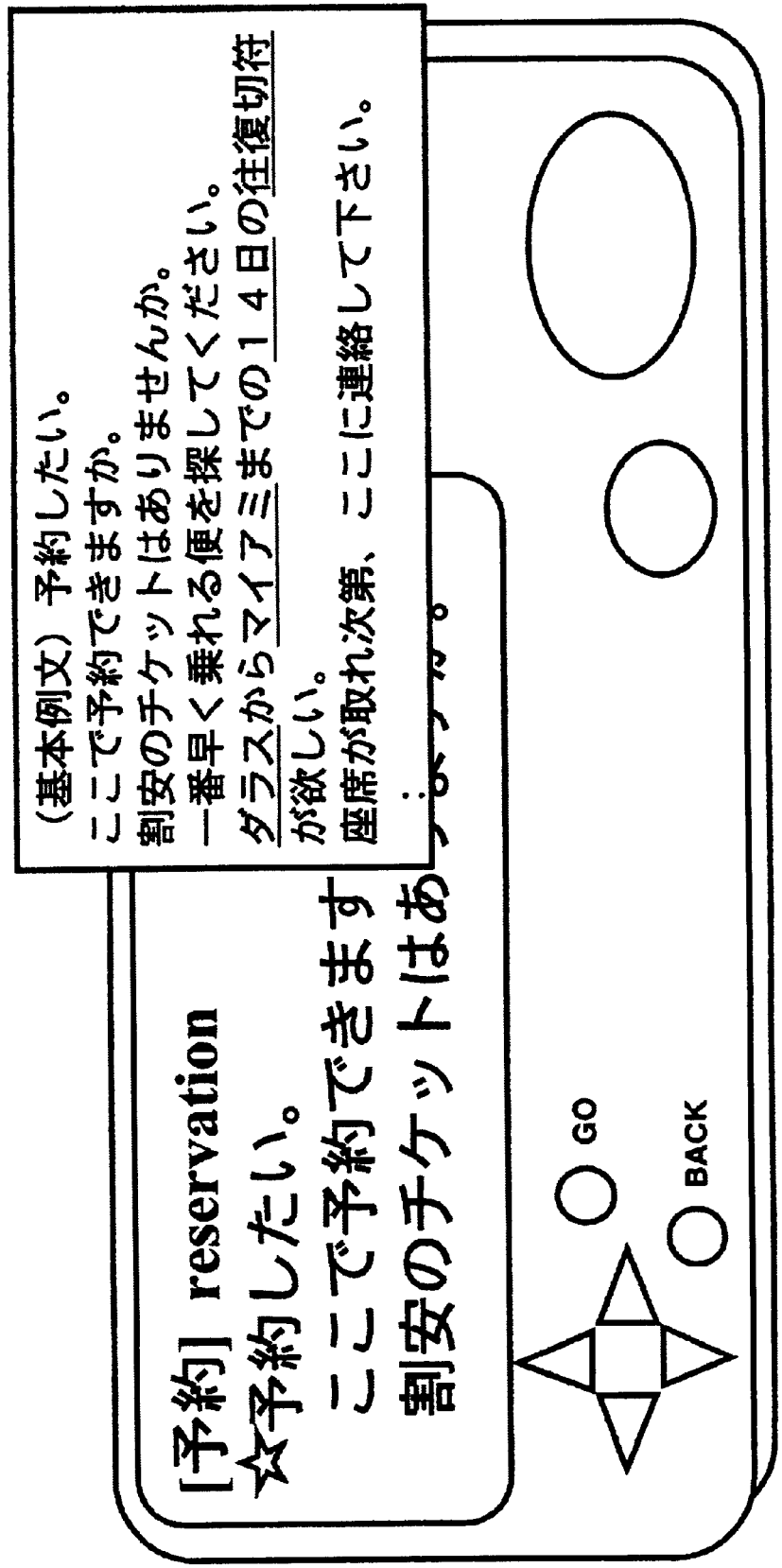
FIG. 12 illustrates an example of a display on the screen in a detailed sentence display step.

Next, a detailed sentence display will be described with reference to FIGS. 3 and 9. For selecting a sentence with the scroll keys, when the user selects the mark "♀" at the head of a basic sentence instead of the sentence itself and presses the execution key (see FIG. 9), detailed sentences related thereto are displayed (314). For example, in the sentence display screen of FIG. 9, when the user selects 「予約したい」 (I'd like to make a reservation) on the third line and presses the execution key, a translation result is displayed. When the user selects the mark "♀" on the left side of 「予約したい」 (I'd like to make a reservation) and presses the execution key, the speech translation device displays detailed sentences related to 「予約したい」 (I'd like to make a reservation) as illustrated in FIG. 12.

Next, the spoken sentence recognition will be described referring back to FIG. 3. When the user speaks a sentence while viewing the sentence display screen (315), the speech translation device executes a spoken sentence recognition program (316). The spoken sentence recognition may be performed in accordance with a continuous speech recognition algorithm using HMMs, for example, described in "Speech Recognition Using Probability Model" (the Institute of Electronics, Information and Communication Engineers, pp 46–50, 1988).

Figure 5:
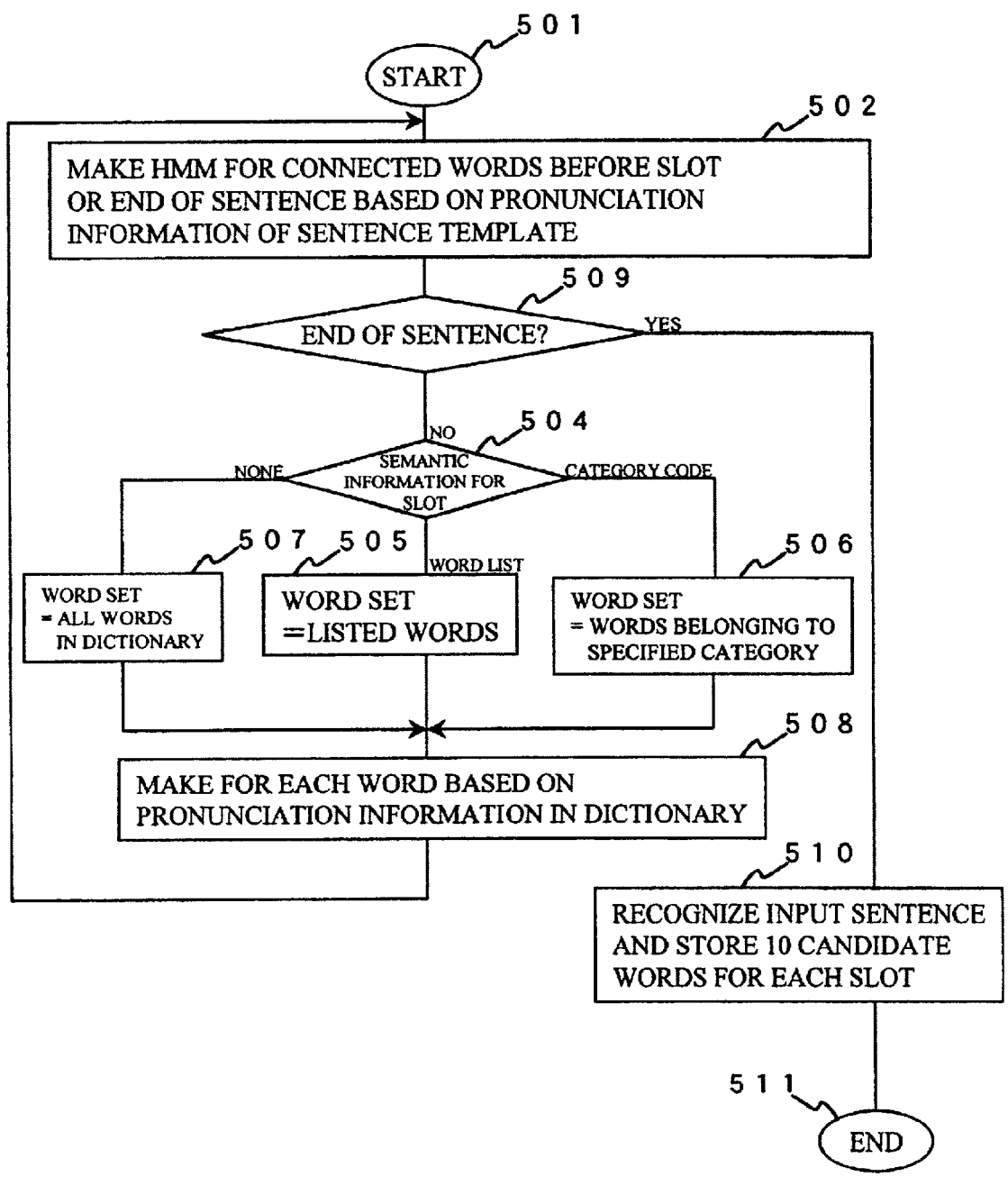
FIG. 5 is a flow chart illustrating a procedure of inputted spoken sentence recognition.

FIG. 5 illustrates a flow of the spoken sentence recognition processing. First, a finite state automaton as illustrated in FIG. 14 is created for a sentence template displayed on the screen. FIG. 14 illustrates a finite state automaton created for a sentence template 「一番近い<s 1>ですか」 (where is the nearest <s1>?). In FIG. 14, blocks 1401, 1402 represents HMMs (Hidden Marcov models) created from pronunciation information 「イチバンチカイ」 (the nearest) and 「ワドコデスカ」 (where is?). A model for a portion of a sentence template in the source language is created on the basis of the pronunciation information 606 described in the sentence file (502 in FIG. 5).

A model for a portion associated with a slot is created on the basis of pronunciation information on words that may be inputted in the slot. For creating this model, the speech translation device first references the semantic information 6095 in the slot information 609 within the sentence file (504) to recognize which of words registered in the dictionary can be inputted in the slot. Such words that can be inputted in the slot are assumed in the following manner: when words are listed in the semantic information 6095 of the slot, the listed words are designated (505); when a category code is specified, those words that have the specified category code are designated (506); and when nothing is specified, words registered in the dictionary are designated (507). A model for each word is created on the basis of the pronunciation information 704 of the word described in the dictionary (508).

Once the finite state automaton has been created for the sentence template displayed on the screen (509), the speech translation device performs the speech recognition for an input sentence in accordance with the continuous speech recognition algorithm using HMMs, and stores the most likely ten words as candidate words for each slot (510).

It should be noted that while the user is speaking a sentence viewing a sentence template, the user may put pauses before and/or after a slot, and/or immediately after a clause including a slot. Therefore, the speech translation device may be configured to create, for each sentence template, finite state automatons for phrases that are marked off at positions at which a pause is likely to be placed in addition to the finite state automaton for the entire sentence, resulting in a higher recognition accuracy. In the foregoing example, finite state automatons may be created for phrases as 「イチバンチカイ」 (the nearest), 「バステイ」 (bus stop), 「ワドコデスカ」 (where is?), and so on in addition to 「イチバンチカイバステイ」 (where is the nearest bus stop?), and corresponded to sentence templates which include these phrases. It is further contemplated that the pause may be actively introduced in the speech recognition. For example, when a pause is placed after 「イチバンチカイ」 (the nearest), the speech translation device may display that this matches the portion 「一番近い」 (the nearest) in 「一番近い<s1>はどこですか」 (where is the nearest <s1>?) so as to lead the user to speak the sequel of the sentence after confirmation.

While in this embodiment, a word inserted in a slot is recognized within the range of words registered in the dictionary, all words cannot be previously registered in the dictionary. Particularly, nouns such as proper nouns, local special products and so on cannot be covered by the dictionary, although they are rather important for conversations during travels. Nevertheless, when the user wants to use such a word, he may often know the word in the original language, and therefore he can mimic anyhow the pronunciation of the word, if only word, in many cases. Keeping the foregoing assumption in mind, it is contemplated that when the user orally inputs an expression within a slot while holding down a particular button, the speech translation device outputs a translated sentence embedded with the pronunciation inputted by the user as it is in a portion associated with the slot. As described above, with the employment of the method of creating finite state automatons corresponding to phrases, and corresponding the created finite state automatons to sentence templates including the phrases, it is possible to identify a sentence template from phrases before and after a portion spoken by the user as he holds down the particular button. In this way, it is possible to use a sentence template such as 「[このアトラクション]は何分待ちですか」 (How many minutes do I have to wait for [this attraction]?) to speak 「Back to the future は何分待ちですか」 (How many minutes do I have to wait for Back to the future?). In addition, with respect to a particular slot such as <S1> in 「私の名前は<s1>です」 (My name is <S1>.), the pronunciation inputted by the user as it is may be embedded in a portion associated with the slot in a translated sentence.

While in this embodiment, sentence templates compared with a spoken sentence are limited to those displayed on the screen, all sentence templates retrieved with a keyword may be compared with the spoken sentence. Alternatively, sentence templates previously selected by the user or most recently used sentence templates may be stored in a "user sentence template file" such that these sentence templates are compared with a spoken sentence.

When using the method of creating finite state automatons corresponding to phrases, and corresponding the created finite state automatons to sentence templates including the phrases, it is contemplated that when a sentence template is displayed, a portion of the sentence template which requires a voice input may be marked with a wave line or the like so as to indicate the user that the user need not speak the entire sentence. This method can improve the usability of the speech translation device. For example, with a sentence 「一番早く乗れる便を探してください」 (Please find out the earliest available flight.), the user may only speak a part of the sentence such as 「一番早く乗れる便を探して」 (Find out the earliest available flight) or 「一番早く乗れる便」 (the earliest available flight), whereby the user is less burdened with the voice input.

Figure 11:
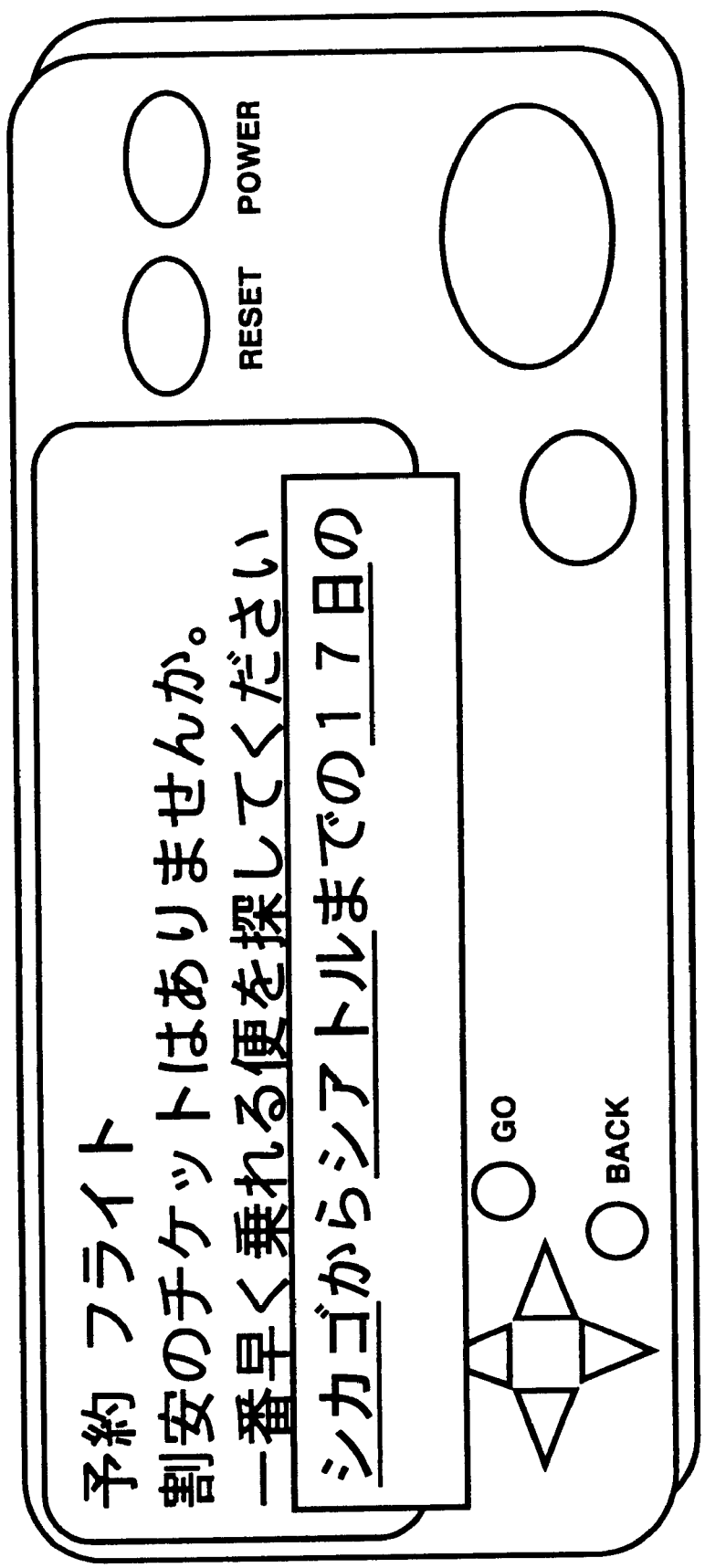
FIG. 11 illustrates an example of a display on the screen in a sentence recognition result display step.

Next, how to display and correct a sentence recognition result will be described referring again to FIG. 3. The result of spoken sentence recognition is displayed by moving the cursor to a recognized sentence template and replacing a word in a slot from a representative sentative example to an input word (317). For example, when the user orally inputs 「シカゴからシアトルまでの17日の片道切符が欲しい」 (I'd like a one-way ticket from Chicago to Seattle on 17th) while the sentence display screen of FIG. 10 is being displayed, and the speech translation device correctly recognizes this spoken sentence, a screen of FIG. 11 is displayed. After viewing the sentence recognition result, the user may press the "BACK" button to input again a sentence (318), or corrects the sentence recognition result as required (319). If the selection of a sentence template is not correct, the user selects another template sentence with the scroll keys, causing the speech translation device to recognize again a word in the slot using the newly selected sentence template. If the recognition of a word in the slot is not correct, the user selects the slot with the scroll keys and presses the execution key, causing the speech translation device to display candidate words for the slot which have been stored upon the sentence recognition. If a correct word exists within the displayed word candidates for the slot, the user may select it with the scroll keys and presses the execution key to decide the selection.

Next, the translation will be described continuously referring to FIG. 3. When a sentence matching an orally inputted sentence is established, the user presses the execution button to instruct the speech translation device to execute translation (320–321). It is also possible for the user to select a basic sentence through voice input and view detailed sentences by selecting the mark "♀" at the head of the selected basic sentence and pressing the execution button (321). The template translation is performed by embedding a translation of an expression in the slot into a translated sentence of a sentence template (322). In the sentence template, grammatical information 6096 is described for the slot in the translated sentence. By referencing this grammatical information 6096 and grammatical information 709 for a translated word in the dictionary 204, the article, number and so on are determined for a translated word in a portion associated with the slot. For example, when a slot specified as "indefinite article, singular" is embedded with a word "apple" with grammatical information indicating "starting with a vowel", the indefinite article "an" is accompanied. Also, when a slot specified as "non-article, plural" is embedded with a word "candy", the plural form "candies" is embedded in the slot.

Figure 13:
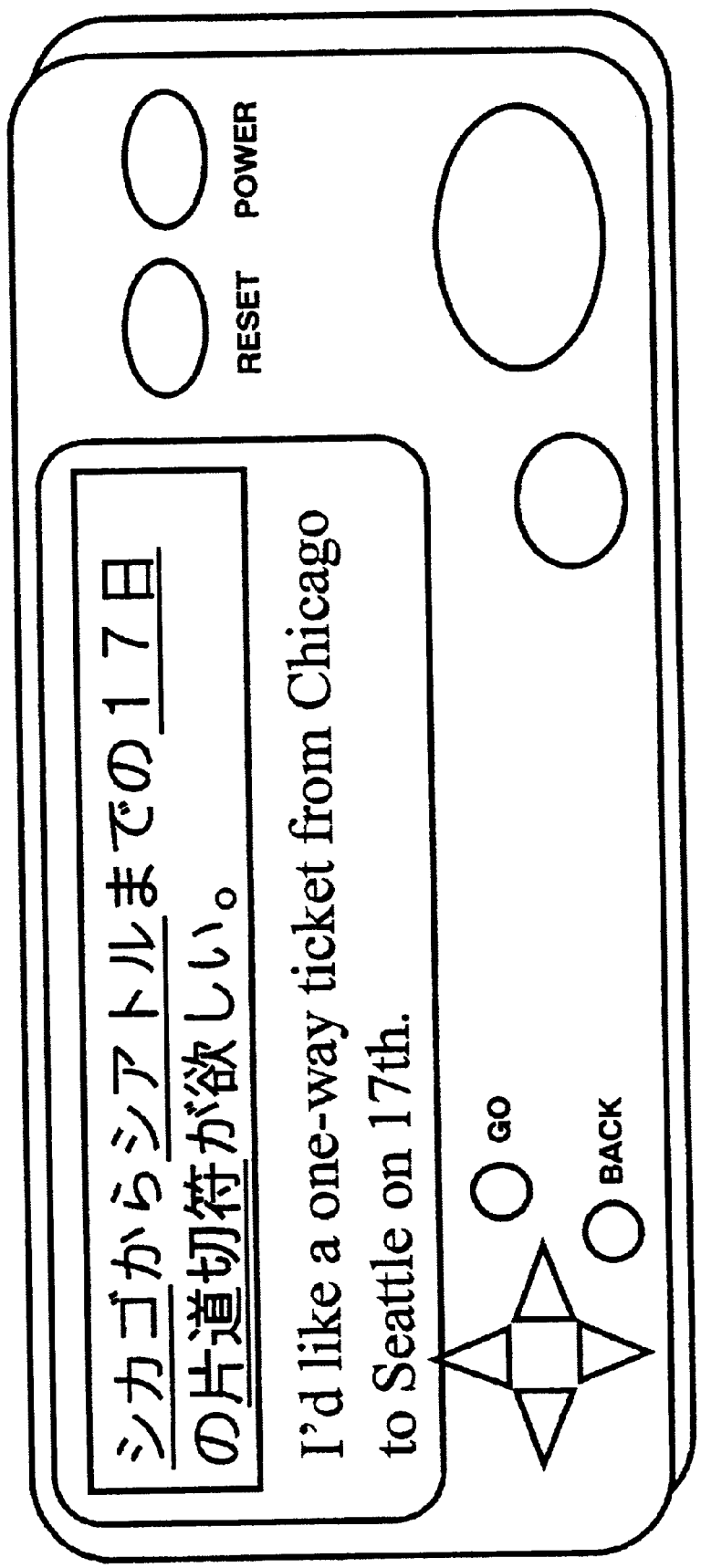
FIG. 13 illustrates an example of a display on the screen in a translation result display step.

At a translation result display step (323), the speech translation device displays a translation result display screen as illustrated in FIG. 13. When the user's command is inputted by pressing the "BACK" button (324), the speech translation device displays the example sentence which has been displayed before the execution of the translation (325). When the user selects the translated sentence and presses the execution button, the speech translation device reads out the translated sentence (326). When the user selects the sentence in the source language and presses the execution button, the speech translation device displays an example sentence for next utterance (327). The sentence displayed as an example sentence for next utterance may be a detailed sentence related thereto when the formerly translated sentence is a basic sentence, and a sentence displayed before the execution of the translation when the formerly translated sentence is a detailed sentence. Such a display scheme is employed because it is contemplated that a set of detailed sentences retrieved with the same keyword includes related sentences so that the user is likely to successively use (a plurality of) sentences from these sentences. As an alternative, it is contemplated that keywords associated with scenes such as 「ホテル」 (hotel), 「フロント」 (front), 「買い物」 (shopping) and so on may be allocated to each sentence template as information independent of keywords, which may be referred to as "scene information", such that sentences having common scene information are only displayed as sentences for next utterance. It is furthermore contemplated that when a keyword search is newly made, sentences having the same scene information as the previously used sentence may be preferentially displayed on upper lines, and that the same scene is continued until the translation device is reset such that sentences are narrowed down by the scene information to gradually display a less number of sentences. While in this embodiment, the bilingual sentence templates are used to perform the template translation, the true object of the sentence template is to lead the user's utterance. It is therefore contemplated that the translation processing is performed by the machine translation relying on a dictionary and grammatical rules. In this case, the sentence templates need not be bilingual, and only sentence templates in an input language are required.

Figure 4:
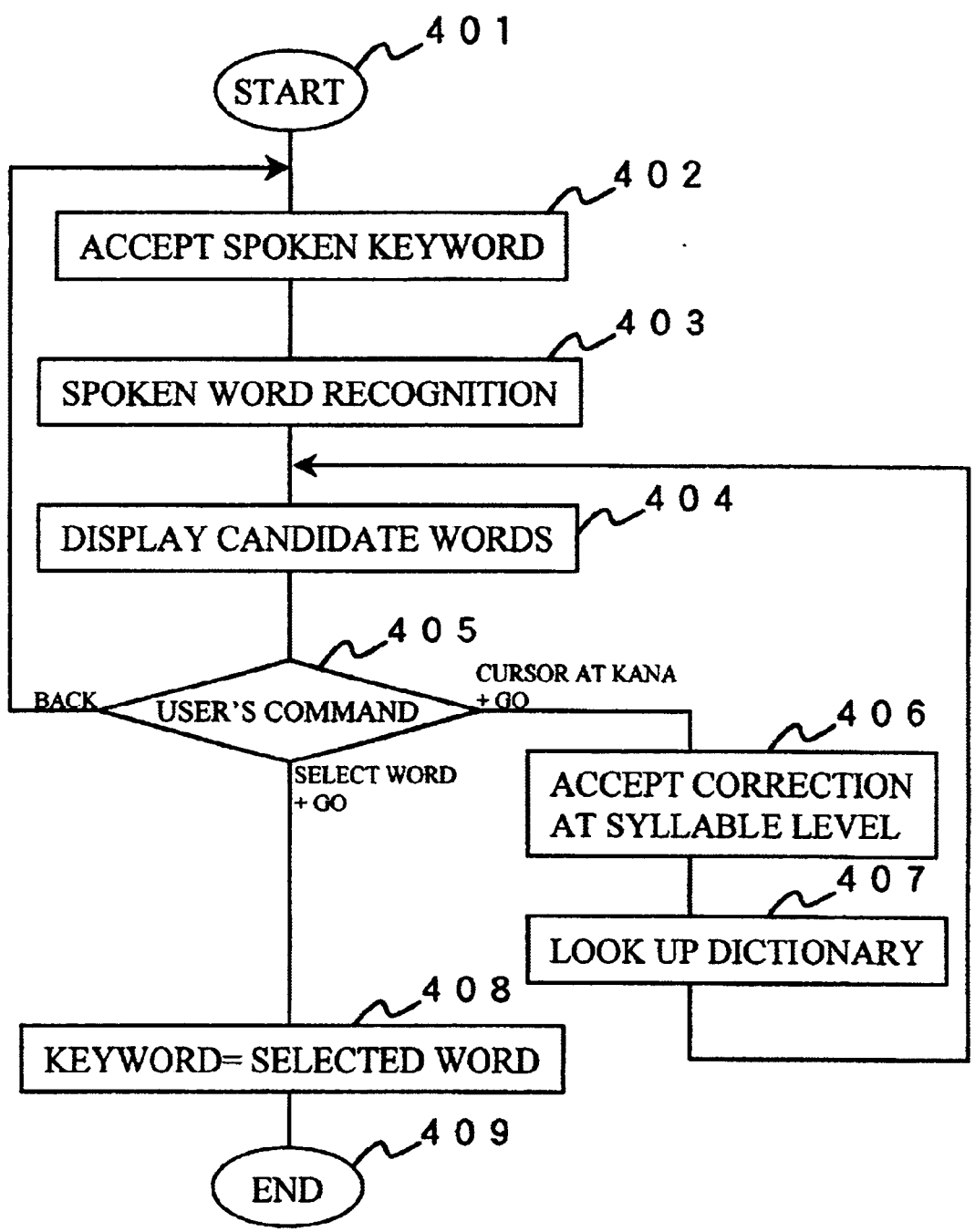
FIG. 4 is a flow chart illustrating a procedure of spoken word recognition.

While the present invention has been described in the context of an embodiment as a portable speech translation device, the present invention may also be a recording medium which has recorded thereon the flows illustrated in FIGS. 3, 4 and 5 for implementing the translation device as described above. Such a recording medium may be a computer readable recording medium having recorded thereon a program causing a computer to operate as the speech translation device, wherein the program comprises the steps of recognizing an orally inputted expression by speech recognition means; retrieving sentence templates related to the orally inputted expression from a sentence file; displaying the retrieved sentence templates on a display; recognizing a sentence uttered by a user based on the displayed sentence examples; comparing the recognized sentence with each of the retrieved sentence templates to recognize the most matching sentence template; replacing a replaceable expression within the matching sentence template based on the sentence uttered by the user and translating the sentence template with the replaced expression; and displaying a translation result on the display or audibly outputting the translation result.

Also, in another form of translation device, an alternative user interface may be envisaged. For example, it is contemplated that a speech translation device installed at the reception of a hospital, a public office, a hotel or the like may be provided with a touch panel screen such that the speech translation device only generates a word which is replaced by a person touching a slot with a finger. While the foregoing embodiment is configured to retrieve sentence templates with an orally inputted keyword in consideration of a reduction in the size of the display screen and one-hand held operability, it is also possible to classify sentence templates in accordance with a scene or a purpose of speech (question, request, explanation, or the like) and narrow down the sentence templates by displaying a menu showing such options so that the user may select any option from the menu.

While the foregoing embodiment has been described for a speech translation device for translating from Japanese to English, the present invention can be applied to any pair of other languages. Also, in the bilingual sentence template of the foregoing embodiment, information for recognition is described for the sentence template in the source language, while information for generation is described for the sentence template in the target language. Alternatively, when information for recognition and information for generation are described for both the template sentences in the source and target languages, the translation may be bi-directionally executed. For performing such bi-directional translation, it is effective to correspond a sentence template for a question sentence to sentence templates for answer sentences in a manner similar to that used to correspond a basic sentence to detailed sentences in the foregoing embodiment.

According to the present invention, it is possible to rapidly retrieve sentence templates matching the user's intent of speech from an orally inputted keyword to lead the user's utterance. Since the user speaks viewing the sentence templates, the user can speak what he wants to say in the form of complete sentence. In addition, since the user can input and speak an arbitrary expression in a slot of a sentence template, the user is free from a troublesome manipulation for replacing a word in the slot. Thus, the present invention can realize a translation device which provides both advantages of a table look-up translation device and advantages of a machine translation device.

While the present invention has been described above in connection with the preferred embodiments, one of ordinary skill in the art would be enabled by this disclosure to make various modifications to this embodiment and still be within the scope and spirit of the invention as defined in the appended claims.

What is claimed is:

1. A translation device comprising a CPU, speech recognition means for recognizing an inputted speech, and storage means for storing a plurality of sentence templates, wherein:
   said CPU displays a set of said sentence templates related to a first inputted speech recognized by said speech recognition means;
   said speech recognition means recognizes a second inputted speech while said set of said sentence templates are being displayed, by comparing with pronunciation information of said displayed sentence templates and selecting a sentence template similar to said second inputted speech; and
   said CPU translates said recognized result and displays the result of said translation.

2. A translation device according to claim 1, further comprising a voice output unit for audibly outputting said translated sentence.

3. A translation device comprising a CPU, speech recognition means for recognizing an inputted speech, a display, and storage means for storing a plurality of sentence templates, wherein:
   said display displays a set of said plurality of sentence templates related to a first speech recognized by said speech recognition means;
   said speech recognition means comparing a second speech with pronunciation information of said set of displayed sentence templates and recognizes a sentence template similar to said second speech from said set of displayed sentence templates as said second speech said CPU replaces an expression within the recognized sentence template based on said second speech, and translates a resulting sentence; and
   said display displays the result of said translation.

4. A translation device according to claim 3, wherein said display provides a shaded display or a reverse display for a replaceable expression when said display displays said retrieved sentence templates.

5. A translation device comprising a CPU, speech recognition means for recognizing an input speech, a display, storage means for storing a plurality of sentence templates, and voice output means, wherein:
   said display displays sentence templates retrieved on the basis of a first speech recognized by said speech recognition means;
   said CPU compares a second speech recognized by said speech recognition means while said sentence templates are being displayed with pronunciation information of said retrieved sentence templates to recognize said sentence template approximate to said second speech, converting the recognized sentence template based on said second speech, and then translating said sentence template; and
   said voice output means audibly outputs a translated sentence.

6. A translation device comprising a CPU, speech recognition means for recognizing a speech, a display, storage means for storing a plurality of sentence templates, and selection means, wherein:
   said display displays sentence templates related to a first speech recognized by said speech recognition means;
   said selection means selects a slot in said displayed sentence template;
   said speech recognition means recognizes second speech which is inputted while said selection means selects said slot;
   said CPU replaces an expression of said slot based on said recognized result of said second speech, and translating a resulting sentence; and
   said display displays the result of said translation.

7. A translation device according to claim 6, wherein said selection means comprises a touch panel or buttons mounted on a main surface of said translation device.

8. A computer readable recording medium having recorded thereon a program for causing a computer to operate as a translation device, said program comprising the steps of:
   recognizing a first speech by speech recognition means;
   retrieving sentence templates related to said first speech, and displaying the retrieved sentence templates on a display;
   recognizing a second speech by said speech recognition device, by comparing with pronunciation information of said displayed sentence templates and selecting a sentence template similar to said second speech;
   replacing an expression within one of said retrieved sentence templates based on said second speech, and translating a resulting sentence; and
   displaying the translation result on the display.

9. A computer readable recording medium having recorded thereon a program for causing a computer to operate as a translation device, said program comprising the steps of:
   recognizing a first speech by speech recognition means;
   retrieving sentence templates related to said first speech;
   displaying the retrieved sentence templates on a display;
   recognizing a second speech inputted while said sentence templates are being displayed by said speech recognition means;
   comparing said second speech with said retrieved sentence templates to recognize a sentence template for translation approximate to said second speech, by comparing with pronunciation information of said displayed sentence templates and selecting a sentence template similar to said second speech;
   replacing an expression within said sentence template for translation based on said second speech, and translating a resulting sentence; and
   displaying the translation result on said display.

* * * * *